(12) United States Patent
Smith et al.

(10) Patent No.: US 7,277,961 B1
(45) Date of Patent: Oct. 2, 2007

(54) METHOD AND SYSTEM FOR OBSCURING USER ACCESS PATTERNS USING A BUFFER MEMORY

(75) Inventors: Jonathan M. Smith, Princeton, NJ (US); Salvatore J. Stolfo, Ridgewood, NJ (US); Jeffrey C. Sherwin, New York, NY (US); Jeffrey D. Chung, Cupertino, CA (US); Andreas L. Prodromidis, Brooklyn, NY (US)

(73) Assignee: IPrivacy, LLC, New York, NY (US)

( * ) Notice: Subject to any disclaimer, the term of this patent is extended or adjusted under 35 U.S.C. 154(b) by 1274 days.

(21) Appl. No.: 09/703,213

(22) Filed: Oct. 31, 2000

(51) Int. Cl.
*G06F 15/173* (2006.01)

(52) U.S. Cl. .................... 709/238; 709/219; 705/25

(58) Field of Classification Search ............... 709/238, 709/219; 707/10; 705/26, 25
See application file for complete search history.

(56) References Cited

U.S. PATENT DOCUMENTS

| 5,420,926 | A | 5/1995 | Low et al. |
| 5,557,518 | A | 9/1996 | Rosen |
| 5,621,797 | A | 4/1997 | Rosen |
| 5,671,280 | A | 9/1997 | Rosen |
| 5,703,949 | A | 12/1997 | Rosen |
| 5,715,314 | A | 2/1998 | Payne et al. |
| 5,724,424 | A | 3/1998 | Gifford |
| 5,729,594 | A | 3/1998 | Klingman |
| 5,732,400 | A | 3/1998 | Mandler et al. |

(Continued)

FOREIGN PATENT DOCUMENTS

EP 0747867 A1 11/1996

(Continued)

OTHER PUBLICATIONS

Peter H. Lewis, "Internet Hide and Seek," N.Y. Times, Apr. 8, 1999, at G1,2.

(Continued)

*Primary Examiner*—Jason Cardone
*Assistant Examiner*—Adnan M. Mirza
(74) *Attorney, Agent, or Firm*—Morgan, Lewis & Bockius LLP

(57) ABSTRACT

A method and system for obscuring user requests for information in a computer network. A user request for information, aimed at another network member, is routed to a first cache memory. If the first cache memory contains the requested information, the cache returns the requested information in response to the user request without releasing the user request to the network member. If the first cache memory does not contain the requested information, a first reference editing function edits user identity information contained in the request, resulting in an edited request with obscured identity information. The edited request is then released to the network member and the requested information is received by the user from the network member. A copy of the requested information is stored in the first cache memory. In this method and system, user privacy is enhanced because user requests for information that can be satisfied by information stored in the cache memory are not revealed to other network members, and user requests that cannot be satisfied by the cache memory are obscured by the reference editing function prior to release to other network members. A software program and system for implementing the method are also disclosed.

27 Claims, 4 Drawing Sheets

| Request No. | Reference String | Buffer Contents | Large Memory Reference |
|---|---|---|---|
| 1 | 03 | X X X X | 03 |
| 2 | 14 | 03 X X X | 14 |
| 3 | 15 | 14 03 X X | 15 |
| 4 | 09 | 15 14 03 X | 09 |
| 5 | 02 | 09 15 14 03 | 02 |
| 6 | 06 | 02 09 15 14 | 06 |
| 7 | 05 | 06 02 09 15 | 05 |
| 8 | 03 | 05 06 02 09 | 03 |
| 9 | 05 | 03 05 06 02 | Obscured |
| 10 | 08 | 03 05 06 02 | 08 |
| 11 | 09 | 08 03 05 06 | 09 |
| 12 | 07 | 09 08 03 05 | 07 |
| 13 | 09 | 07 09 08 03 | Obscured |
| 14 | 03 | 07 09 08 03 | Obscured |
| 15 | 02 | 07 09 08 03 | 02 |
| 16 | 03 | 02 07 09 08 | 03 |
| 17 | 06 | 03 02 07 09 | 06 |
| 18 | 05 | 06 03 02 07 | 05 |

U.S. PATENT DOCUMENTS

| | | | |
|---|---|---|---|
| 5,754,938 A | 5/1998 | Herz et al. | |
| 5,754,939 A | 5/1998 | Herz et al. | |
| 5,768,391 A | 6/1998 | Ichikawa | |
| 5,784,565 A | 7/1998 | Lewine | |
| 5,794,221 A | 8/1998 | Egendorf | |
| 5,802,497 A | 9/1998 | Manasse | |
| 5,809,144 A | 9/1998 | Sirbu et al. | |
| 5,815,665 A | 9/1998 | Teper et al. | |
| 5,862,325 A | 1/1999 | Reed et al. | |
| 5,878,139 A | 3/1999 | Rosen | |
| 5,878,141 A | 3/1999 | Daly et al. | |
| 5,883,810 A | 3/1999 | Franklin et al. | |
| 5,887,060 A | 3/1999 | Ronning | |
| 5,899,980 A | 5/1999 | Wilf et al. | |
| 5,903,721 A | 5/1999 | Sixtus | |
| 5,907,677 A | 5/1999 | Glenn et al. | |
| 5,961,593 A | 10/1999 | Gabber et al. | |
| 5,982,891 A | 11/1999 | Ginter et al. | |
| 6,000,832 A | 12/1999 | Franklin et al. | |
| 6,006,200 A | 12/1999 | Boies et al. | |
| 6,014,646 A | 1/2000 | Vallee et al. | |
| 6,061,789 A | 5/2000 | Hauser et al. | |
| 6,085,168 A | 7/2000 | Mori et al. | |
| 6,101,484 A | 8/2000 | Halbert et al. | |
| 6,119,101 A * | 9/2000 | Peckover | 705/26 |
| 6,125,352 A | 9/2000 | Franklin et al. | |
| 6,128,663 A | 10/2000 | Thomas | |
| 6,148,343 A | 11/2000 | Lewine | |
| 6,170,879 B1 | 1/2001 | Rawlings | |
| 6,202,159 B1 | 3/2001 | Ghafir et al. | |
| 6,314,425 B1 * | 11/2001 | Serbinis et al. | 707/10 |
| 6,366,947 B1 * | 4/2002 | Kavner | 709/203 |
| 6,523,068 B1 * | 2/2003 | Beser et al. | 709/238 |

FOREIGN PATENT DOCUMENTS

| | | |
|---|---|---|
| EP | 0855 659 A1 | 7/1998 |
| JP | 10-320646 | 12/1998 |
| WO | WO97/15885 | 5/1997 |
| WO | WO97/26612 | 7/1997 |
| WO | WO 01/13275 | 2/2001 |

OTHER PUBLICATIONS

Tina Kelley, "Buying Is Only a Click (Oops!) Away," N.Y. Times, Feb. 8, 1999, at G1,2.

Denise Caruso, "Digital Commerce," N.Y. Times, Mar. 1, 1999, at C4.

Bob Tedeschi, "E-Commerce Report," N.Y. Times, Mar. 8, 1999, at C4.

John Markoff, "Novell to Offer Data-Privacy Technology For Internet," N.Y. Times, Mar. 22, 1999, at C1.

Lorrie Faith Cranor, "Internet Privacy: A Public Concern," pp. 13-18.

Communications of the ACM, Feb. 1999, vol. 42, No. 2.

Platform for Privacy Preferences (P3P) Syntax Specification (Working Draft Apr. 7, 1999).

Anonymizer.com, Privacy is Your Right (visited Apr. 8, 1999) <http://www.anonymizer.com/3.0/index.shtml>.

Crowds, Anonymity Loves Company (visited Apr. 8, 1999) <http://www.research.att.com/projects/crowds/>.

Lucent Personalized Web Assistant (visited Apr. 8, 1999) <http://www.bell-labs.com/project/lpwa/>.

Zero-Knowledge System Announces Freedom (visited Apr. 8, 1999) <http://www.zeroknowledge.com>.

Novell Previews digitalme: Directory enabled Technology for Personal Control of Identity on the Internet, Mar. 22, 1999 <http://www.novell.com>.

Privaseek, The First Consumer Infomediary (visited Mar. 10, 1999) <http://www.privaseek.com>.

mValue, Where Privacy Pays . . . (visited Feb. 25, 2000) <http://www.mvalue.com/index.jsp>.

\* cited by examiner

| Request No. | Reference String | Buffer Contents | Large Memory Reference |
|---|---|---|---|
| 1 | 03 | X X X X | 03 |
| 2 | 14 | 03 X X X | 14 |
| 3 | 15 | 14 03 X X | 15 |
| 4 | 09 | 15 14 03 X | 09 |
| 5 | 02 | 09 15 14 03 | 02 |
| 6 | 06 | 02 09 15 14 | 06 |
| 7 | 05 | 06 02 09 15 | 05 |
| 8 | 03 | 05 06 02 09 | 03 |
| 9 | 05 | 03 05 06 02 | Obscured |
| 10 | 08 | 03 05 06 02 | 08 |
| 11 | 09 | 08 03 05 06 | 09 |
| 12 | 07 | 09 08 03 05 | 07 |
| 13 | 09 | 07 09 08 03 | Obscured |
| 14 | 03 | 07 09 08 03 | Obscured |
| 15 | 02 | 07 09 08 03 | 02 |
| 16 | 03 | 02 07 09 08 | 03 |
| 17 | 06 | 03 02 07 09 | 06 |
| 18 | 05 | 06 03 02 07 | 05 |

FIG. 1

METHOD AND SYSTEM FOR OBSCURING USER ACCESS PATTERNS USING A BUFFER MEMORY

FIELD OF THE INVENTION

The present invention relates generally to computer networks and, more particularly, to a method and system that employs a cache memory, also known as a buffer memory, in combination with a reference editing function to obscure user access patterns. The present invention is particularly applicable in open computer networks, such as the Internet.

BACKGROUND OF THE INVENTION

As used herein, the term "computer" includes any device or machine capable of accepting data, applying prescribed processes to the data, and supplying the results of the processes. By way of example, but not limitation, the term "computer" includes mainframe computers, servers, personal computers, laptops, personal digital assistants, portable phones, cell phones and calculators. The term "communications network" is also meant in a broad sense, and may include any suitable technology for information transmission, including electrical, electromagnetic and optical technologies. Such a communications network may link computers, e.g., a LAN or WAN. Although the invention is described with particular reference to an open network, such as the Internet, it may also be used in other networks, internets and intranets.

The Internet, or World Wide Web, continues to increase in importance as a place for business, offering a wide variety of information and services to potential customers. However, shopping, browsing and other information-sharing activities on the Internet expose users to unwanted collection of their private and personal information, from which their identities, activities, behaviors and preferences can be ascertained. For example, without a user's permission, web marketers and merchants often gather "click data" that details every web-site a user visits with his or her browser. Underlying communications protocols and systems may provide additional private and/or personal information. This data is then used to create demographic profiles linked with the user's identity, including his or her name, postal address and e-mail address, gender, age, and other personal information. This information is routinely bought and sold among parties who link and merge the information with other transaction data from other sources (i.e., "data mining") offered for sale by third parties and vendors to create a sophisticated and detailed behavior profile of users, in order to target those users for advertising. This unwarranted level of intrusion into the private information of a user, often unknown to the user, is perceived as a fundamental threat to personal freedoms, creating an outcry among a number of privacy groups and a potential impediment to the growth of e-commerce. U.S. patent application Ser. No. 09/360,812, to the present inventor, which discusses these privacy concerns and discloses a system and method for anonymous Internet transactions, is hereby incorporated by reference.

SUMMARY OF THE INVENTION

In some computer network applications it is desirable to obscure user access patterns. For example, some users may want to hide their interest in a referenced object (i.e., a site on the World-Wide Web or a specific item of information located on such a site), and/or prevent their identities from being discovered and tracked by others. The present invention uses a cache memory, also known as a buffer memory, to obscure patterns in the reference behavior of a user seeking one or more objects accessible through the cache memory. An application using the World-Wide Web infrastructure is used to illustrate the concept.

In a preferred embodiment, the present invention provides a method for obscuring user requests for information in a computer network. A user computer request for information, aimed at another network member, is routed to a first cache memory. If the first cache memory contains the requested information, the requested information is returned in response to the user request without releasing the user request to the network member. If, however, the first cache memory does not contain the requested information, user identity information contained in the request is edited, resulting in an edited request with obscured identity information. The edited request is then released to the network member, the user computer receives the requested information from the network member, and a copy of the requested information is stored in the first cache memory. In this method, user requests for information that can be satisfied by information stored in the cache memory are not revealed to other network members, and user requests that cannot be satisfied by the cache memory are obscured by editing prior to release to other network members. The communications network may be the Internet, and the user request for information may be a Uniform Resource Locator (URL) reference string.

The edited request may be routed to a second cache memory prior to releasing the edited request to the network member and, if the second cache memory contains the requested information, the requested information is returned to the user computer in response to the edited request without releasing the edited request to the network member. In addition, if the second cache memory does not contain the requested information, the user identity information contained in the request is further edited prior to releasing the edited request to the network member.

The first cache memory may be resident on the user computer, or it may be resident on a computer remote from the user computer. Similarly, the editing may be performed by the user computer, or it may be performed by a computer remote from the user computer.

In another embodiment, the present invention is a software program implemented in a computer system for obscuring user requests for information on a computer network. The software program configures the computer system to (1) route a user computer request for information, aimed at another network member, to a first cache memory; (2) if the first cache memory contains the requested information, return the requested information in response to the user request without releasing the user request to the network member; (3) if the first cache memory does not contain the requested information, edit user identity information contained in the request, resulting in an edited request with obscured identity information; (4) release the edited request to the network member; (5) receive the requested information from the network member; and (6) store a copy of the requested information in the first cache memory such that user requests for information that can be satisfied by information stored in the cache memory are not revealed to other network members, and user requests that cannot be satisfied by the cache memory are obscured by editing prior to release to other network members. The computer network may be the Internet, and the user computer request for information may be a Uniform Resource Locator (URL) reference string.

The network member may be a server computer. The cache memory may be resident on the user computer or on a computer remote from the user computer.

The software program of the present invention may further configure the computer system to route the edited request to a second cache memory prior to releasing the edited request to the network member, and, if the second cache memory contains the requested information, return the requested information in response to the edited request without releasing the edited request to the network member. If the second cache memory does not contain the requested information, the software program may further configure the computer system to further edit the user identity information contained in the edited request prior to releasing the edited request to the network member.

In still another embodiment, the invention is a system for obscuring user requests for information in a computer network comprising a user computer having a processor, a server computer containing information sought by the user computer, a first cache memory capable of storing information, and a reference editing function capable of editing user identity information contained in a request for information. A request for information from the user computer, aimed at the server computer, is routed by the processor to the first cache memory. If the first cache memory contains the requested information, the requested information is returned in response to the user request without releasing the user request to the server computer. However, if the first cache memory does not contain the requested information, the first reference editing function edits user identity information contained in the request prior to releasing the request to the server computer, and upon receipt of the requested information from the server computer, the first cache memory stores a copy of the requested information. Thus, user requests for information that can be satisfied by information stored in the first cache memory are not revealed to other network members, and user requests that cannot be satisfied by the first cache memory are obscured by the first reference editing function prior to release to the server computer. The computer network may be the Internet, and the user computer request for information may be a Uniform Resource Locator (URL) reference string. The first cache memory may be resident on the user computer or on a computer remote from the user computer. The first reference editing function may also be resident on the user computer or on a computer remote from the user computer.

In one specific embodiment, the system further comprises a second cache memory wherein the edited request for information is routed to the second cache memory prior to release to the server computer, and if the second cache memory contains the requested information, the requested information is returned in response to the edited request without releasing the edited request to the server computer. The system may also comprise a second reference editing function, wherein if the second cache memory does not contain the requested information, the second reference editing function further edits the user identity information contained in the edited request prior to releasing the edited request to the server computer.

BRIEF DESCRIPTION OF THE DRAWINGS

The present invention will be understood and appreciated more fully from the following detailed description, taken in conjunction with the drawings in which:

FIG. 1 is a table illustrating buffer cache behavior with a memory and a reference string;

DETAILED DESCRIPTION OF THE PREFERRED EMBODIMENTS

Figure 2:
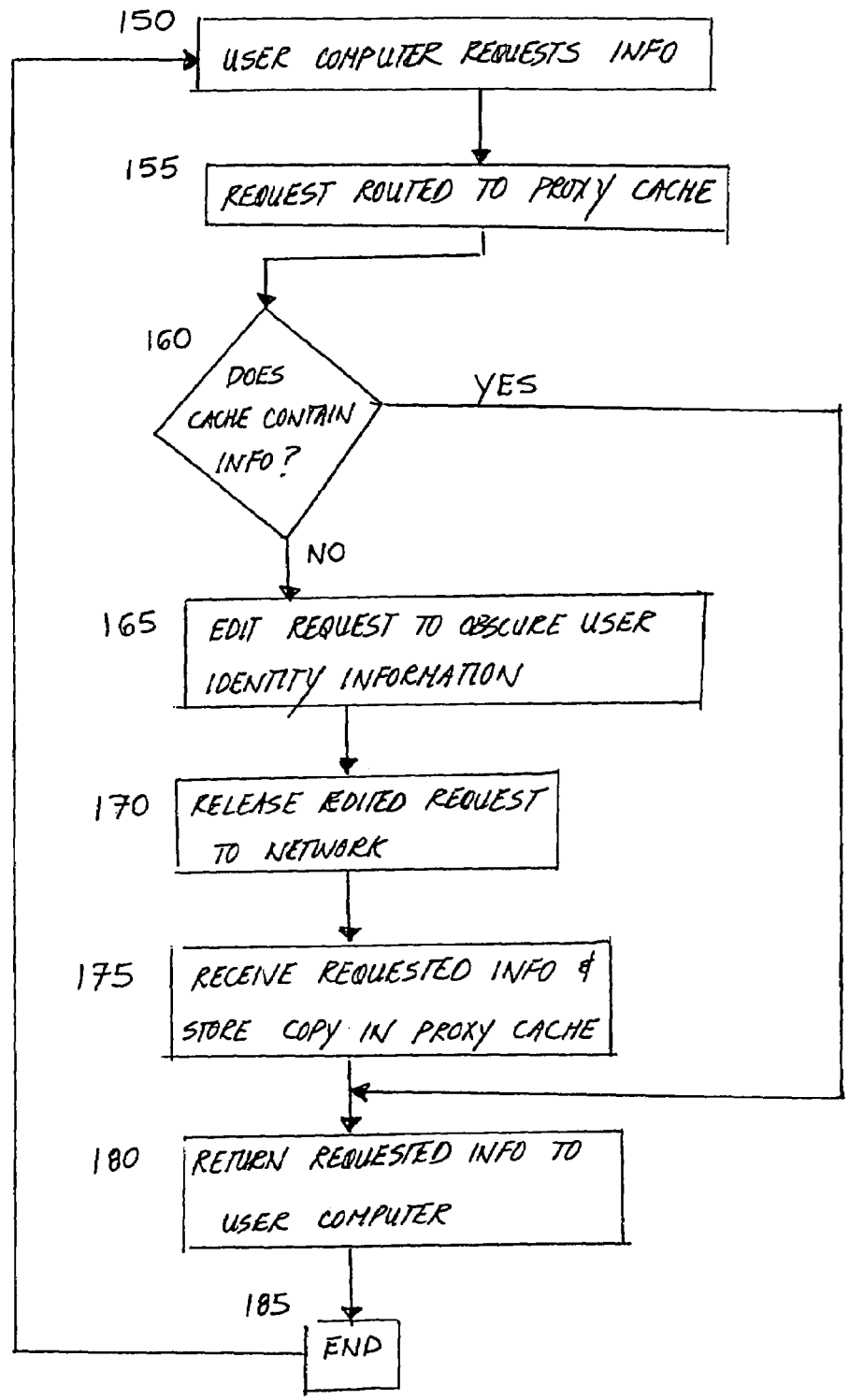
FIG. 2 is flowchart illustrating the steps in a preferred embodiment of the method of the present invention.

Ideally, computers would be equipped with infinitely large storage systems, with zero cost and zero access time, which never fail. While this is not possible, engineers have, over time, developed various techniques for approximating these desiderata. In particular, the use of a small amount of "buffer" cache memory, consisting of a small portion of fast, expensive memory, in conjunction with a larger, cheaper, slower memory, has proven effective. Buffer caches are widely used in computer systems because computer programs exhibit "locality of reference" properties such that references in the program to memory locations tend to access repeatedly the same locations in memory. This makes it feasible to reduce system costs and improve average access time by storing the computer program in the slow memory and transferring referenced items from the slow memory to the fast memory, where they can be used subsequently. When references, arranged in a so-called "reference string," are made against the combined memories, access time is improved whenever the reference string repeatedly accesses the same locations, so that the references can be satisfied with the copy in fast memory.

Because propagation and queuing delays strongly affect the responsiveness of networks, network systems such as the World Wide Web (WWW) attempt to use the buffer principle by interposing "proxy caches" in the network. Examples include Harvest and Squid.

In the World Wide Web context, the references discussed above are names—in the form of Universal Resource Locators (URLs). URLs are presented to the WWW infrastructure (web servers) that interpret strings such as "http://www.iPrivacy.com" to gain access to data that is eventually sent to the user's display by means of a software "Web browser" such as Netscape NAVIGATOR™ or Microsoft's INTERNET EXPLORER™.

As discussed above, a pervasive problem in the use of the Internet technology is the lack of privacy. Among the many organizations describing the extent and technologies for identity and behavior capture on the Internet are Junkbusters, Inc. (http://wwwjunkbusters.org). The reasons for this loss of privacy are manifold.

First, the basic Internet transport service, IP, provides a source and destination address in each data packet. The source address of the packet provides a means of identifying the sender.

Second, the technology used to access data over the Internet, the "web browser" (exemplified by Netscape and Microsoft Internet Explorer), provides many mechanisms with which users can be identified (e-mail addresses, login names, organization names, or "cookies" deposited on the user's machines).

Third, the mechanisms available have been exploited aggressively by organizations such as commercial enterprises which can derive advantage from greater knowledge of behavior. Examples of these advantages include better-directed advertising.

Finally, this data can be combined with other data (address, telephone, demographic) in data-mining exercises which thoroughly link behavior and identity.

This loss of privacy has led to the development of technologies providing various levels of anonymity when the Internet is being used. These technologies perform one or more of the following functions:

1. IP address rewriting (so the IP source address is lost)
2. Cookie deletion
3. Pseudonym provision/anonymous e-mail
4. HTML editing As with Web caches, these technologies are typically implemented as Web "proxies." An example of an anonymizing client proxy is the Internet Junkbuster proxy, found at http://wwwjunkbusters.com. An example of an anonymizing server proxy is the Lucent Personal Web Assistant, found at http://www.proxymate.com. The advantage of a server proxy is that with a location distinct from the client, it automatically rewrites IP addresses since the proxy's IP address is distinct from the client machine's.

It is an object of the present invention to combine a proxy cache with an anonymizing proxy to increase anonymity. This is accomplished by obscuring patterns in user references to the Web. Since the caching function and the anonymizing function (i.e., reference editing function) do not interfere with each other, the caching function can occur before or after the anonymizing function with the same effect. Further, multiple caching proxies or multiple anonymizing proxies can be combined for further anonymity.

Reference is now made to FIG. 1, which is a table illustrating buffer cache behavior with a memory and reference string. Column 100 simply numbers successive reference requests; column 101 shows successive user reference requests (i.e., a reference string); column 102 depicts which reference requests can be satisfied by the contents of a simple four-element buffer memory; and column 104 shows the reference requests that cannot be satisfied by the current contents of the buffer memory and therefore are made to a large memory. For illustration purposes, the large memory is presumed to have 16 addresses, numbered 1 through 16 at which information is stored and the reference string consists of numerical indices to the addresses of the large memory. The contents of the buffer memory are the information found at the memory addresses specified by the reference requests listed in column 102. It should be understood that reference requests satisfied by accessing the large memory (column 104) are susceptible to tracking by an entity monitoring the large memory, while requests that are satisfied by the contents of the buffer memory (column 102) would be either significantly less susceptible or insusceptible to such tracking.

The table demonstrates how successive accesses to the large memory, column 104, are obscured when the buffer cache, column 102, successfully delivers the data requested. These events are marked by the word "Obscured" in column 104, which indicates that no reference request was made to the large memory.

At the time of the first request, the four element buffer, column 102 is empty. After each of the first four requests, a copy of the information stored at the address specified by the reference request is stored in one of the available spaces in the buffer memory. Thus, after the first four requests, the buffer is full. It should be understood that new reference requests will replace previously stored information associated with previous reference requests in the four element buffer when the information specified by new reference request is retrieved from the large memory. In this sense, the contents of the buffer is not fixed.

As shown in highlighted rows 106, 108, 110, the references to indices 05, 09 and 03, respectively, have been "obscured" because the buffer has provided the requested information. As the cache is more successful (i.e., as its "hit rate" increases), more and more references are obscured, and further, the inter-reference time varies with the success of the buffer cache. The effect of the cache on the reference string, column 104, is to obscure (i.e., prevent or inhibit others from tracking) a user's pattern of reference request (i.e., pattern of reference), column 101. Thus, as shown in FIG. 1, any entity tracking the references to the large memory will have less information concerning the user's access patterns, because the tracking entity will not be able to record the user's request for indices 05, 09 and 03 (shown in rows 106, 108, and 110).

Reference is now made to FIG. 2, which is a flowchart illustrating the steps in a preferred embodiment of the method of the present invention. In step 150, a user computer requests information from another network member. In a preferred embodiment, the network member is a server computer. In step 155, the user request is routed to a proxy cache memory. This cache memory may be resident at the user computer or located remote from the user computer. In step 160, a test is made to determine if the cache memory has the requested information. If the cache has the requested information, the requested information is returned to the user computer at step 180. The process ends at step 185, and the system awaits the next request for information.

Returning to step 160, if the cache memory does not have the requested information, the request is edited in step 165 to obscure user identity information. The request is then released to the network in step 170, but due to the edited identity information, anyone attempting to trace the request will have difficulty linking it to the user computer. Assuming the request can be satisfied by a network member, in step 175 the requested information is received (either by the user computer or some proxy server) and a copy is stored in the cache memory. In step 180, the requested information is returned to the user computer. In step 185, the process ends, and the system awaits the next information request.

Figure 3:
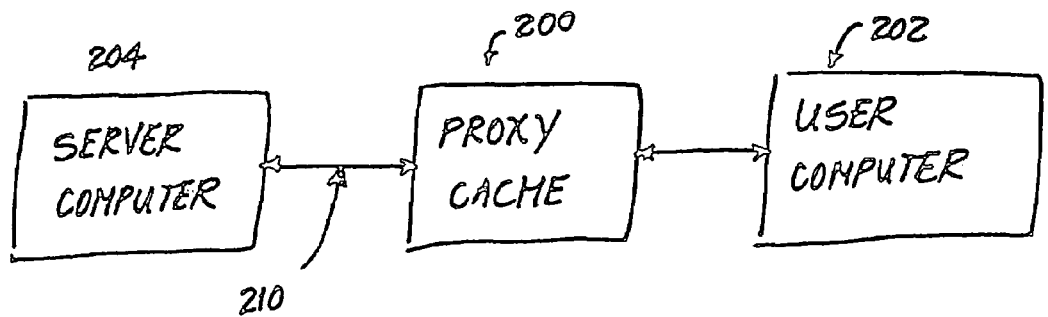
FIG. 3 is a block diagram illustrating the operation of a proxy cache in a computer network.

As illustrated in FIG. 3, in one embodiment the proxy cache 200 is placed between the browser (running on user computer 202) and the server 204. The cache examines URLs to see if the requested data can be obtained from its storage rather than by accessing the server. As in the traditional buffer cache example, this proxy cache can both reduce delays (if the proxy cache is "closer" to the client than the server, e.g., on a LAN) and traffic (since no network traffic to the server is needed).

In addition, a reference editing function is advantageously combined with the proxy cache so that the references generated by the user requests, when passed through the buffering/caching system, are obscured.

Figure 3A:
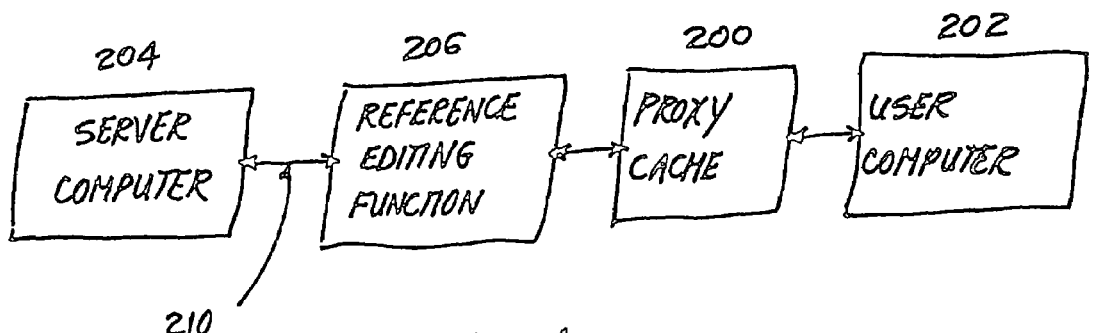
FIGS. 3A through 3D are block diagrams illustrating the operation of one or more proxy cache memories in combination with a reference editing function in a computer network.
Figure 3B:
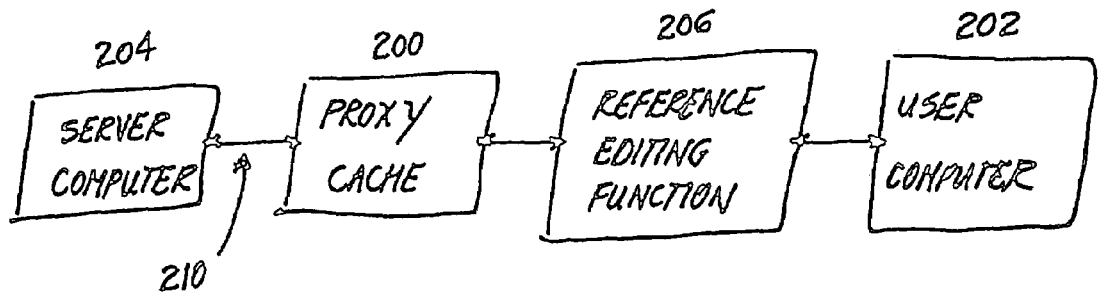

Four such combinations are illustrated in FIGS. 3A-3D. In FIG. 3A, a reference request (i.e., a URL reference string) from a user computer 202 is routed to a proxy cache 200. The proxy cache 200 may be resident at the user computer, or it may be located remote from the user computer and connected to the user computer via a communications network, such as the World Wide Web, or Internet. The cache 200 examines the URL to see if the requested data can be obtained from its storage rather than by accessing the server. As in the traditional buffer cache example, this proxy cache can both reduce delays (if the proxy cache is "closer" to the client than the server, e.g., on a LAN) and traffic (since no network traffic to the server is needed). If the cache can satisfy the request, the information is returned to the user computer 202. If, however, the cache 200 does not contain the requested information, a reference editing function 206, edits the URL reference string to obscure the true identity of the user computer. The edited request is then released to the targeted server computer 204. In FIG. 3A, a communications network 210 connects the user computer 202 and the server computer 204. As with the proxy cache, the reference editing function 206 may be resident at the user computer 202 or located remote from the user computer and connected to the user computer via a communications network. In addition, as shown in FIG. 3B, the order of the proxy cache 200 and reference editing function 206 may be reversed, resulting in the reference string being edited by the reference editing function 206 before it is released to the proxy cache 200.

Figure 3C:
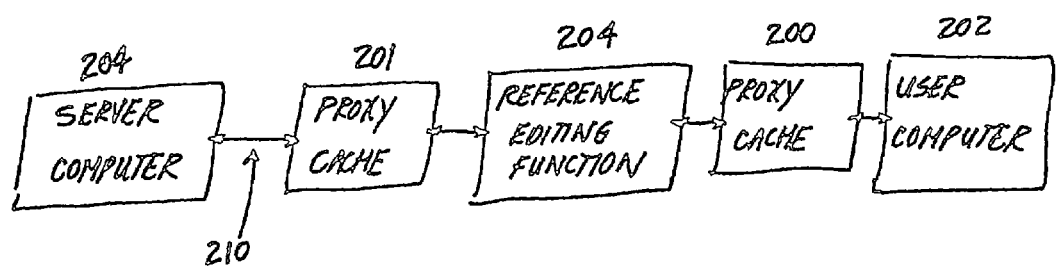
Figure 3D:
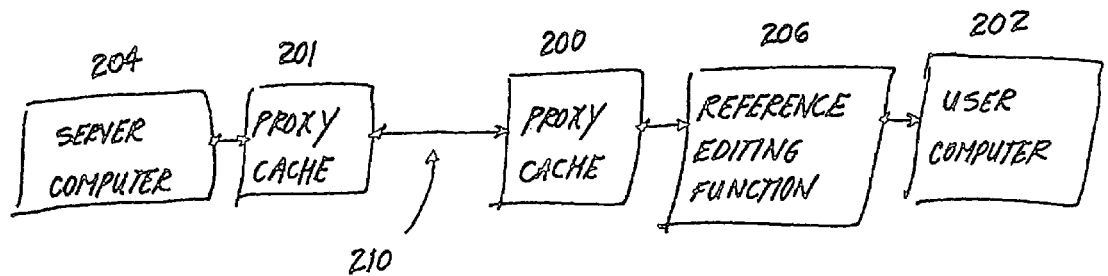

FIGS. 3C and 3D illustrate systems with multiple proxy caches 200, 201. The second proxy cache 201 may be resident at the user computer 202 (as shown in FIG. 3C) or remotely located from the user computer and connected to the user computer via communications network 210 (as shown in FIG. 3D). In addition, multiple reference editing functions may also be implemented, either resident at the user computer or remotely located.

While the present invention has been described with reference to the preferred embodiments, those skilled in the art will recognize that numerous variations and modifications may be made without departing from the scope of the present invention. Accordingly, it should be clearly understood that the embodiments of the invention described above are not intended as limitations on the scope of the invention, which is defined only by the following claims.

What is claimed is:

1. In a computer network, a method for obscuring user requests for information comprising:
   routing a user computer request for information, aimed at another network member, to a first cache memory;
   if the first cache memory contains the requested information, returning the requested information in response to the user request without releasing the user request to the network member;
   if the first cache memory does not contain the requested information, editing user identity information contained in the request, resulting in an edited request with obscured identity information;
   releasing the edited request to the network member;
   receiving the requested information from the network member; and
   storing a copy of the requested information in the first cache memory such that user requests for information that can be satisfied by information stored in the cache memory are not revealed to other network members, and user requests that cannot be satisfied by the cache memory are obscured by editing prior to release to other network members.

2. The method of claim 1, further comprising the step of:
   routing the edited request to a second cache memory prior to releasing the edited request to the network member; and
   if the second cache memory contains the requested information, returning the requested information in response to the edited request without releasing the edited request to the network member.

3. The method of claim 2, further comprising the step of:
   if the second cache memory does not contain the requested information, further editing the user identity information contained in the edited request prior to releasing the edited request to the network member.

4. The method of claim 1, wherein the computer network is the Internet.

5. The method of claim 4, wherein the user computer request for information is a Uniform Resource Locator (URL) reference string.

6. The method of claim 1, wherein the network member is a server computer.

7. The method of claim 1, wherein the first cache memory is resident on the user computer.

8. The method of claim 1, wherein the first cache memory is resident on a computer remote from the user computer.

9. The method of claim 1, wherein the editing is performed by the user computer.

10. The method of claim 1, wherein the editing is performed by a computer remote from the user computer.

11. In a computer network, a software program embedded in a computer-readable medium for obscuring user requests for information, said software program configuring a computer system to:
    route a user computer request for information, aimed at another network member, to a first cache memory;
    if the first cache memory contains the requested information, return the requested information in response to the user request without releasing the user request to the network member;
    if the first cache memory does not contain the requested information, edit user identity information contained in the request, resulting in an edited request with obscured identity information;
    release the edited request to the network member;
    receive the requested information from the network member; and store a copy of the requested information in the first cache memory such that user requests for information that can be satisfied by information stored in the cache memory are not revealed to other network members, and user requests that cannot be satisfied by the cache memory are obscured by editing prior to release to other network members.

12. The software program of claim 11, further configuring the computer system to:
    route the edited request to a second cache memory prior to releasing the edited request to the network member; and
    if the second cache memory contains the requested information, return the requested information in response to the edited request without releasing the edited request to the network member.

13. The software program of claim 12, further configuring the computer system so that, if the second cache memory does not contain the requested information, it edits the user identity information contained in the edited request prior to releasing the edited request to the network member.

14. The software program of claim 11, wherein the computer network is the Internet.

15. The software program of claim 14, wherein the user computer request for information is a Uniform Resource Locator (URL) reference string.

16. The software program of claim 11, wherein the network member is a server, computer.

17. The software program of claim 11, wherein the cache memory is resident on the user computer.

18. The software program of claim 11, wherein the cache memory is resident on a computer remote from the user computer.

19. In a computer network, a system for obscuring user requests for information comprising:
- a user computer having a processor;
- a server computer containing information sought by the user computer; a first cache memory capable of storing information; and
- a reference editing function capable of editing user identity information contained in a request for information, wherein a request for information from the user computer, aimed at the server computer, is routed by the processor to the first cache memory, and
  - if the first cache memory contains the requested information, the requested information is returned in response to the user request without releasing the user request to the server computer; but
  - if the first cache memory does not contain the requested information, the first reference editing function edits user identity information contained in the request prior to releasing the request to the server computer, and upon receipt of the requested information from the server computer, the first cache memory stores a copy of the requested information
- such that user requests for information that can be satisfied by information stored in the first cache memory are not revealed to other network members, and user requests that cannot be satisfied by the first cache memory are obscured by the first reference editing function prior to release to the server computer.

20. The system of claim 19, further comprising a second cache memory wherein the edited request for information is routed to the second cache memory prior to release to the server computer, and if the second cache memory contains the requested information, the requested information is returned in response to the edited request without releasing the edited request to the server computer.

21. The system of claim 20, further comprising a second reference editing function, wherein if the second cache memory does not contain the requested information, the second reference editing function further edits the user identity information contained in the edited request prior to releasing the edited request to the server computer.

22. The system of claim 19, wherein the computer network is the Internet.

23. The system of claim 22, wherein the user computer request for information is a Uniform Resource Locator (URL) reference string.

24. The system of claim 19, wherein the first cache memory is resident on the user computer.

25. The system of claim 19, wherein the first cache memory is resident on a computer remote from the user computer.

26. The system of claim 19, wherein the first reference editing function is resident on the user computer.

27. The system of claim 19, wherein the first reference editing function is resident on a computer remote from the user computer.

* * * * *